(12) United States Patent
Aoyama

(10) Patent No.: US 12,198,370 B2
(45) Date of Patent: Jan. 14, 2025

(54) IMAGE FORMING APPARATUS FOR NOTIFYING A USER THAT A DIFFERENT USER OPERATED THE IMAGE FORMING APPARATUS WHEN THE USER IS DETECTED

(71) Applicant: KONICA MINOLTA, INC., Tokyo (JP)

(72) Inventor: Motoaki Aoyama, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 232 days.

(21) Appl. No.: 17/901,963

(22) Filed: Sep. 2, 2022

(65) Prior Publication Data
US 2023/0074571 A1 Mar. 9, 2023

(30) Foreign Application Priority Data

Sep. 8, 2021 (JP) ................. 2021-145979

(51) Int. Cl.
*H04N 1/00* (2006.01)
*G06T 7/70* (2017.01)

(52) U.S. Cl.
CPC .......... *G06T 7/70* (2017.01); *H04N 1/00411* (2013.01); *H04N 1/00689* (2013.01); *H04N 1/00694* (2013.01)

(58) Field of Classification Search
None
See application file for complete search history.

(56) References Cited

U.S. PATENT DOCUMENTS

| | | | |
|---|---|---|---|
| 2010/0332823 A1* | 12/2010 | Tsujimoto | H04N 1/4413 726/3 |
| 2018/0063347 A1* | 3/2018 | Conlon | H04N 1/00737 |
| 2018/0097944 A1* | 4/2018 | Otake | G06F 3/1203 |
| 2021/0373819 A1* | 12/2021 | Shimamura | G06F 3/1236 |
| 2024/0069829 A1* | 2/2024 | Tokumoto | H04N 1/00 |

FOREIGN PATENT DOCUMENTS

JP 2000250361 A 9/2000

* cited by examiner

*Primary Examiner* — Eric A. Rust
(74) *Attorney, Agent, or Firm* — Buchanan Ingersoll & Rooney PC

(57) ABSTRACT

An information processing device including multiple operation units operable for a user, comprises: a storage; and a hardware processor that: detects the user; detects the operation unit operated by a first user from among the multiple operation units when the first user is being detected; stores operation information in which operation unit is recorded in the storage; and reads the operation information in the storage and notifies a second user of the operation unit operated by the first user when the second user is detected.

19 Claims, 14 Drawing Sheets

FIG. 4

OPERATION INFORMATION 34

| USER | OPERATION UNIT | OPRATION DATE/TIME | ALERT REQUIRED |
|---|---|---|---|
| USER A | DOCUMENT PLACEMENT PART | 2021/07/26 09:23 | YES |
| USER A | DOCUMENT PLACEMENT PART | 2021/07/26 09:23 | YES |
| USER A | PAPER FEEDING TRAY | 2021/07/26 09:25 | YES |
| USER A | PAPER DELIVERING TRAY | 2021/07/26 09:41 | YES |
| ⋮ | ⋮ | ⋮ | ⋮ |

34a, 34b, 34c, 34d

IMAGE FORMING APPARATUS FOR NOTIFYING A USER THAT A DIFFERENT USER OPERATED THE IMAGE FORMING APPARATUS WHEN THE USER IS DETECTED

Japanese patent application No. 2021-145979 filed on Sep. 8, 2021 including description, claims, drawings, and abstract the entire disclosure is incorporated herein by reference in its entirety.

BACKGROUND

Technological Field

The present invention relates to an information processing device, a controlling method and a non-transitory recording medium.

Description of the Related art

Information processing devices such as MFPs (Multifunction Peripherals) installed in places such as offices are shared and used by multiple users. This type of information processing devices is configured to be directly touched and operated by hands of the users as a basic specification. For executing a job such as a scan job or a copy job, for example, the user operates an operational panel of the information processing device, thereby configuring settings of the job. It is assumed, for example, an error such as a paper empty or a toner empty occurs in the information processing device. In this case, the user pulls out a paper feeding tray and refill the paper, and/or opens a front door of the device body to replace a toner bottle by manual. When a copied paper is output on a paper delivering tray due to the copy job, the user pulls out his or her hand to the paper delivering tray and collects the output copied paper.

When the copied paper still remains on the paper delivering tray even after an elapse of a predetermined period of time after, for example, the copy job is executed and the document is removed from the tray, some of the above-described type of information processing device alerts the user not to forget receiving the copied paper. This known technique is introduced for example in Japanese Patent Application Laid-Open No. JP 2000-250361 A.

As infections of novel coronavirus (COVID-19) have been spread recently, it is necessary to prevent the spread of the infections via the information processing device shared and used by multiple users. As described above, the user frequently operates the information processing device by directly touching it by his or her hands. If an operated part that is touched by an infected person is touched by another user, the infection may spread. If another user uses the information processing device without touching the operated part touched by the infected person, there will be less possibility of the spread of the infection.

Although the above-described conventional technique alerts the user, it does not enable to give some kinds of alerts from a point of prevention of the spread of infections. The conventional technique does not prevent the secondary infection via the information processing device.

SUMMARY

The present invention is intended to solve the above problems. Thus, the present invention is intended to provide an information processing device, a controlling method and a non-transitory recording medium that prevent a secondary infection as a second user uses the information processing device after a use by a first user.

First, the present invention is directed to an information processing device including multiple operation units operable for a user.

To achieve at least one of the abovementioned objects, according to an aspect of the present invention, the information processing device reflecting one aspect of the present invention comprises: a storage; and a hardware processor that: detects the user; detects the operation unit operated by a first user from among the multiple operation units when the first user is being detected; stores operation information in which operation unit is recorded in the storage; and reads the operation information in the storage and notifies a second user of the operation unit operated by the first user when the second user is detected.

Second, the present invention is directed to a controlling method of an information processing device comprising multiple operation units operable for a user.

To achieve at least one of the abovementioned objects, according to an aspect of the present invention, the controlling method reflecting one aspect of the present invention comprises: detecting the user; detecting the operation unit operated by a first user from among the multiple operation units when the first user is being detected; storing operation information in which the detected operation unit is recorded in a storage; and reading the operation information in the storage and notifying a second user of the operation unit operated by the first user when the second user is detected.

Third, the present invention is directed to a non-transitory recording medium storing a computer readable program to be executed by a hardware processor in an information processing device comprising multiple operation units operable for a user.

To achieve at least one of the abovementioned objects, according to an aspect of the present invention, the non-transitory recording medium reflecting one aspect of the present invention stores the computer readable program, execution of the computer readable program by the hardware processor causing the hardware processor in the information processing device to perform: detecting the user; detecting the operation unit operated by a first user from among the multiple operation units when the first user is being detected; storing operation information in which the detected operation unit is recorded in a storage; and reading the operation information in the storage and notifying a second user of the operation unit operated by the first user when the second user is detected.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 4 illustrates an example of operation information;

DETAILED DESCRIPTION OF EMBODIMENTS

Hereinafter, one or more embodiments of the present invention will be described with reference to the drawings. However, the scope of the invention is not limited to the disclosed embodiments.

First Preferred Embodiment

Figure 1:
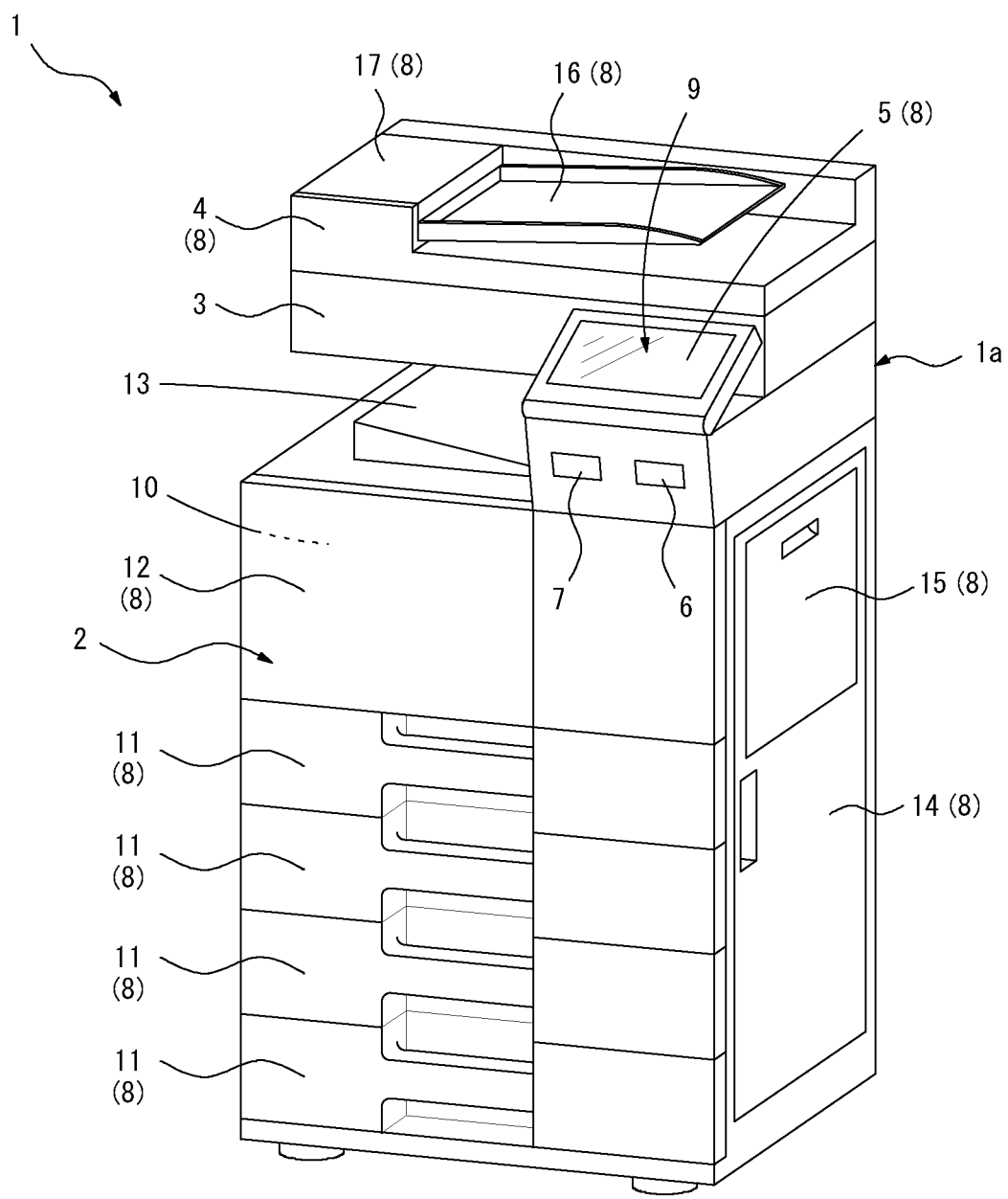
FIG. 1 illustrates a perspective view of an exemplary overall structure of an information processing device.

The first preferred embodiment of the present invention is explained hereafter. FIG. 1 illustrates a perspective view of an exemplary overall structure of an information processing device 1 in which the first preferred embodiment may be practiced. The information processing device 1 is formed from an image processing device such as one of MFPs installed in a place such as an office, for example. The information processing device 1 executes a job such as a scan job, a copy job or a print job based on an instruction given from a user. This type of the information processing device 1 is shared and used by multiple users who work in the office.

The information processing device 1 is provided with a printer section 2 in a lower part of a device body 1a. In response to the execution of the copy job or the print job in the information processing device 1, the printer section 2 forms an image on a sheet such as a printing paper and outputs the sheet on which the image is formed on a paper delivering tray 13 which is arranged on an upper surface of the printer section 2. The printer section 2 includes an image forming unit 10 and multiple paper feeding trays 11. The image forming unit 10 forms an image on the sheet, and the multiple paper feeding trays 11 feed the sheet to the image forming unit 10. The image forming unit 10, for example, is configured to form the image on the sheet in electrophotography. The image forming unit 10 transfers a toner image on the sheet and fixes so that the image is formed. More than one sheet is enabled to be stored in each paper feeding tray 11. The information processing device 1 feeds the sheet stored in the paper feeding tray 11 designated by the user from among the multiple paper feeding trays 11. The information processing device 1 delivers the sheet to the image forming unit 10 along a predetermined carrying path arranged inside the device body 1a, and forms the image on the sheet in the image forming unit 10. The information processing device 1 then delivers the sheet on the paper delivering tray 13.

Each of the multiple paper feeding trays 11 can be opened or closed to the device body 1a. When the sheet stored in each paper feeding tray 11 runs out, the user pulls out the paper feeding tray 11 to the front side to open, thereby he or she is enabled to refill the sheet. Each of the multiple paper feeding trays 11 is one of operation units 8 that can be touched and operated by the user.

In the front side of the image forming unit 10, a front door 12 openable and closable to the device body 1a is attached. When, for example, a toner bottle attached to the image forming unit 10 gets empty, the user opens the front door 12 to replace the toner bottle to the new one. The front door 12 is also one of the operation units 8 that can be directly touched and operated by the user. One of right and left end surfaces is pulled to the front so that the front door 12 can be opened. Each of the right and left end surfaces can be managed as the operation unit 8 operable for the user.

A side door 14 operable and closable to the device body 1a is attached to the side surface of the printer section 2. When a jam occurred while the sheet is being carried, for example, the user opens the side door 14 to take the sheet out that has caused the jam. The side door 14 is also one of the operation units 8 that can be directly touched and operated by the user.

A manual feeding tray 15 openable and closable to the device body 1a is provided with the side door 14. The manual feeding tray 15 is for the user to manually setting the desired sheet thereon besides the paper feeding tray 11. When the user would like to carry out the copy job or the print job using the manual feeding tray 15, for example, he or she opens the manual feeding tray 15 to set the desired sheet on the manual feeding tray 15. The manual feeding tray 15 is also one of the operation units 8 that can be directly touched and operated by the user.

The information processing device 1 includes a scanner section 3 and an automatic document feeder (ADF) 4 in an upper part of the device body 1a. The scanner section 3 optically reads an image of a document placed by the user and generates image data. The automatic document feeder 4 is arranged at the side of the top surface of the scanner section 3. The automatic document feeder 4 includes a document placement part 16 on which the document is placed. The automatic document feeder 4 takes out the document placed on the document placement part 16 one by one, and automatically carries the document to a predetermined reading position, the reading operation of which is carried out by the scanner section 3, linked with the reading operation by the scanner section 3.

The automatic document feeder 4 includes an openable door 17 that opens and closes the carrying path of the document. When a jam occurs during the carriage of the document, for instance, the user opens the openable door 17 so that the document that causing the jam can be taken out. The openable door 17 is also one of the operation units 8 that can be directly touched and operated by the user. The document placement part 16 is also one of the operation units 8 that can be directly touched and operated by the user.

The automatic document feeder 4 is rotatable around a horizontal axis arranged at the side of the back surface of the device body 1a so that the top surface side of the scanner section 3 can be opened. The user pulls up the automatic document feeder 4, for example, and he or she is enabled to manually place the document on a platen glass which is arranged at the side of the top surface of the scanner section 3. The automatic document feeder 4 is also one of the operation units 8 that can be directly touched and operated by the user.

The information processing device 1 is provided with an operational panel 5 on a front side of the device body 1a. The operational panel 5 is a user interface. The operational panel 5 includes a display unit 9. The display unit 9 is constructed by a device such as a color liquid crystal display and on which various types of screens are displayed to the user. The operational panel 5 is provided with a touch panel function that detects an operation performed by the user to the display unit 9. When the user tries to carry out the scan job or the copy job using the information processing device 1, for example, he or she performs the operation to the operational panel 5, and a setting operation of various types of the jobs is performed. The operational panel 5 is also one of the operation units 8 that can be directly touched and operated by the user.

The information processing device 1 is provided with a card reader 6 and a human detecting sensor 7. The card reader 6 and a human detecting sensor 7 are arranged in the vicinity of the operational panel 5 (lower position of the operational panel 5 in FIG. 1). The card reader 6 reads card information such as user information from an IC card carried by the user, for instance, in a non-contact manner The human detecting sensor 7 is constructed by a so-called human detection sensor. The human detecting sensor 7 detects a human exists within a range of the predetermined distance from the information processing device 1 in a non-contact manner As described above, the information processing device 1 includes multiple operation units 8 that can be touched and operated directly by the user. In order to avoid the secondary infection due to pathogens such as COVID-19 via the information processing device 1, when the second user uses after the information processing device 1 is used by the first user, the second user should be notified the operation unit 8 that had been touched and operated by the first user and alerted not to touch the operation unit 8 touched by the first user. The information processing device 1 operates as described below.

Figure 2A:
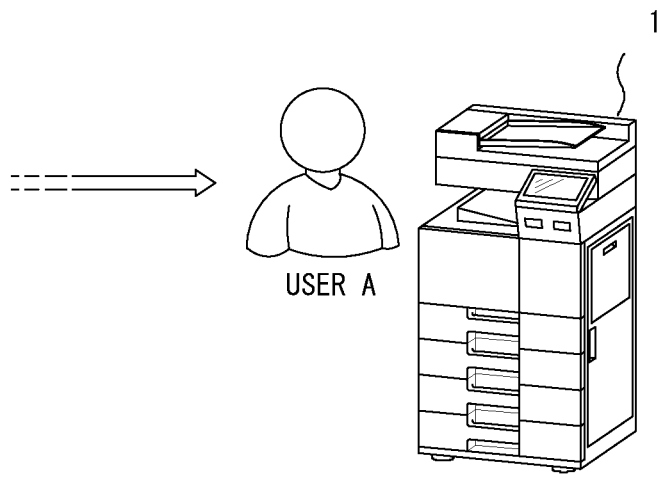
FIGS. 2A and 2B explain a concept of operations of the information processing device.
Figure 2B:
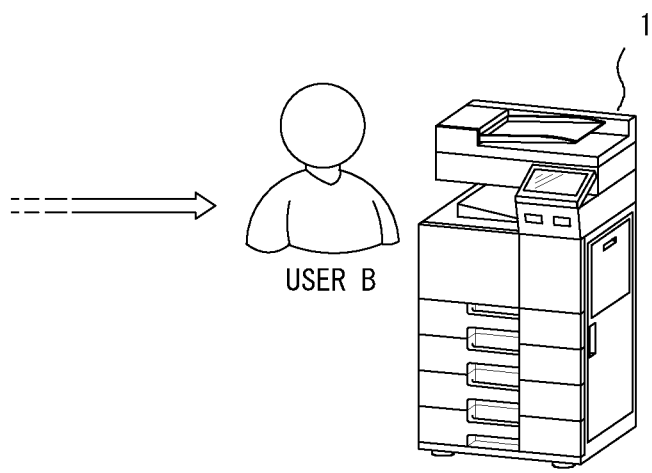
Figure 2B:
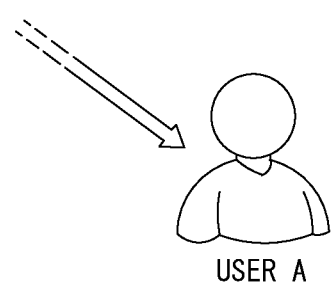

FIGS. 2A and 2B explain a concept of operations of the information processing device 1. As illustrated in FIG. 2A, at first, user A who is the first user uses the information processing device 1. The information processing device 1 detects the operation unit 8 operated by user A from among the multiple operation units 8, and stores information related to the detected operation unit 8. As illustrated in FIG. 2B, user A finishes using the information processing device 1, then leaves the information processing device 1. After user A leaves the information processing device 1, user B who is the second user comes close to the information processing device 1 to use the information processing device 1. The information processing device 1 reads the information relating to the operation unit 8 operated by user A before user B touches the information processing device 1, and notifies user B of the operation unit 8 operated by user A. As a result, user B is allowed to know the operation unit 8 that was touched by the user A. User B is enabled to use the information processing device 1 without touching the operation unit 8 touched by the user A. User B is also allowed to make a decision to use the information processing device 1 other than the information processing device 1 used by user A. Hence, the secondary infection of infectious disease due to pathogens can be prevented. Next, the information processing device 1 is explained in detail.

Figure 3:
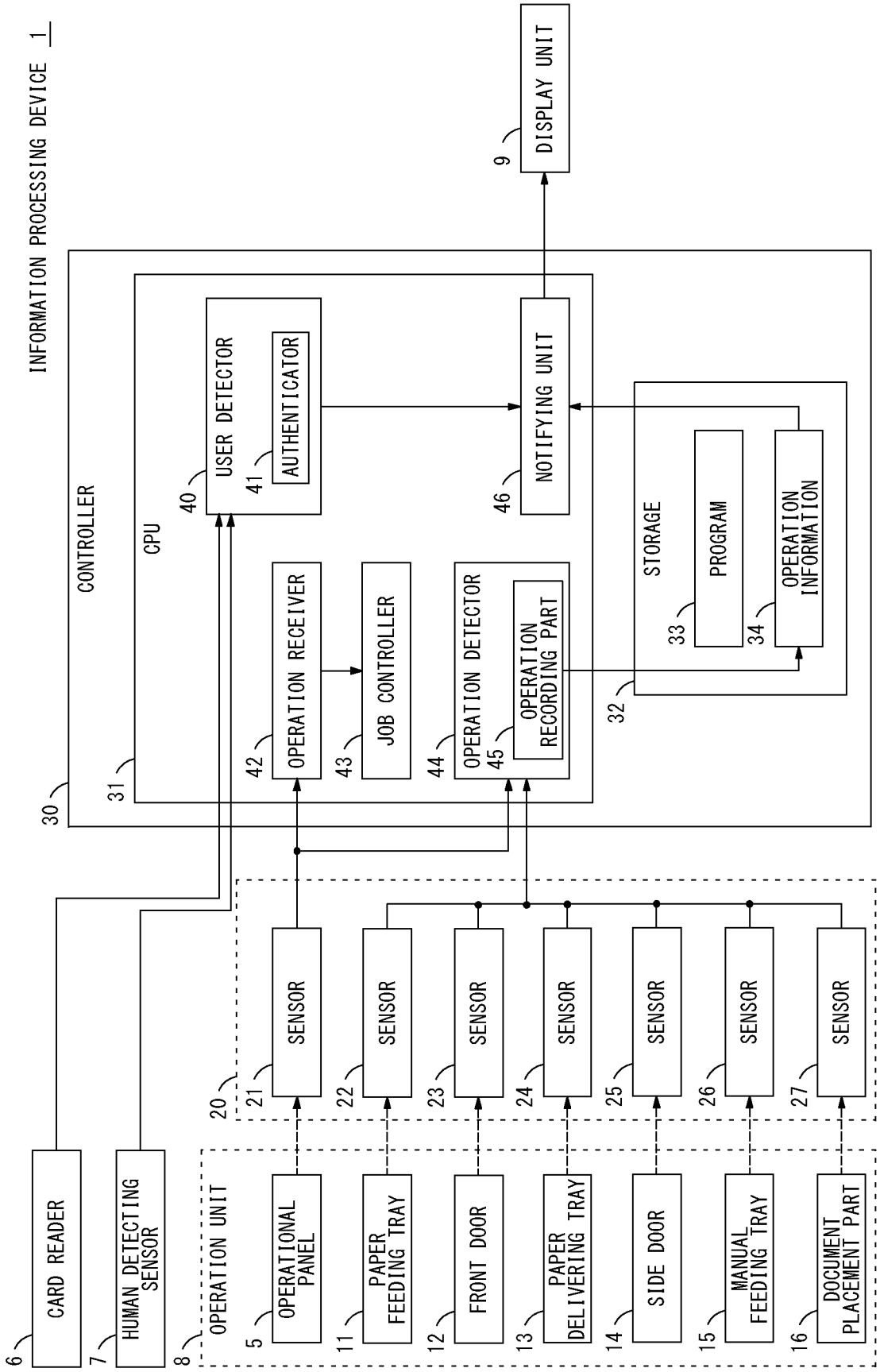
FIG. 3 illustrates a block diagram showing an example of the hardware structure and the functional structure of the information processing device.

FIG. 3 illustrates a block diagram showing an example of the hardware structure and the functional structure of the information processing device 1. As illustrated in FIG. 3, the information processing device 1 includes a group of sensors 20 and a controller 30. The group of sensors 20 detects that each of the multiple operation units 8 is operated by the user.

The group of sensors 20 includes a touch detecting sensor 21, a tray opening detecting sensor 22, a door opening detecting sensor 23, a sheet detecting sensor 24, a door opening detecting sensor 25, a tray opening detecting sensor 26 and a document detecting sensor 27. The touch detecting sensor 21 detects the touch operation by the user to the operational panel 5. The tray opening detecting sensor 22 detects that the paper feeding tray 11 is opened or closed. The tray opening detecting sensor 22 is enabled to detect if each of the multiple paper feeding trays 11 is opened or closed separately. The door opening detecting sensor 23 detects that the front door 12 is opened or closed. The door opening detecting sensor 23 may be detectable if either of right and left end parts is operated by the user. The sheet detecting sensor 24 detects the sheet delivered to the paper delivering tray 13. The door opening detecting sensor 25 detects that the side door 14 is opened or closed. The tray opening detecting sensor 26 detects that the manual feeding tray 15 is opened or closed. These multiple sensors included in the group of sensors 20 detect the operation unit 8 operated by the user. The group of sensors 20 may include a sensor that detects that the automatic document feeder 4 is opened or closed to the scanner section 3.

The controller 30 including a CPU 31 and a storage 32 controls operations of each part included in the information processing device 1. The CPU 31 is a hardware processor that reads and executes a program 33 stored in the storage 32. The storage 32 is formed from a non-volatility device such as a hard disk drive (HDD) or a solid-state drive (SDD), for example. Operation information 34 is stored in the storage 32 besides the program 33 executed by the CPU 31. Information relating to the operation unit 8 operated by the user is stored as the operation information 34.

The CPU 31 executes the program 33 so that it serves as a user detector 40, an operation receiver 42, a job controller 43, an operation detector 44 and a notifying unit 46.

The user detector 40 detects the user who uses the information processing device 1. The human detecting sensor 7 is connected to the user detector 40. As a person is detected by the human detecting sensor 7, the user detector 40 detects the user. When the user detector 40 detects after the human detecting sensor 7 detects the person, it is not identifiable who the user is.

A card reader 6 is connected to the user detector 40. The user detector 40 obtains card information read by the card reader 6. Once an IC card carried by the user is placed within a range that enables the card reader 6 to read the card information, the card reader 6 reads the card information from the IC card, and outputs to the CPU 31. The user detector 40 obtains the card information.

The user detector 40 includes an authenticator 41. The authenticator 41 performs a user authentication based on the card information obtained by the card reader 6 to identify the user who tries to use the information processing device 1. For performing the user authentication, the authenticator 41, for example, extracts the user information included in the card information, and sends the user information to an external authentication server. The authenticator 41 then identifies the user based on the authentication result obtained from the authentication server. Once the user is identified through the user authentication, the authenticator 41 shifts the information processing device 1 to a log-in state in which the identified user is a login user. As the result, the login user is allowed to use the information processing device 1.

As described above, the card reader 6 is enabled to read the card information in non-contact manner. Thus, the user is enabled to log into the information processing device 1 from the log out state without touching the information processing device 1.

The operation receiver 42 receives the user operation such as the job setting operation based on the touch operation of the user detected by the touch detecting sensor 21. When the information processing device 1 is in the login state, the operation receiver 42, for example, receives the operation performed by the login user and receives the job operation setting or an execution instruction.

The job controller 43 controls the execution of the job such as the scan job or the copy job in the information processing device 1. When the operation receiver 42 receives the job execution instruction from the user, for example, the job controller 43 puts the scanner section 3 or the printer section 2 into operation to control the execution of the job specified by the user. When any event such as an occurrence of a jam, a sheet empty, a toner empty is detected during or at the end of the execution of the job, the job controller 43 notifies the notifying unit 46 of the event.

When the login user or the user who is not logging into the information processing device 1 performs an operation to touch one of the multiple operation units 8 of the information processing device 1, the operation detector 44 detects the operation. When, for example, the user performs an operation to touch the operational panel 5, the operation detector 44 detects that the user has performed the operation to touch the operational panel 5 based on the result of the detection by the touch detecting sensor 21. When, for example, the user performs an operation to refill the sheet in the paper feeding tray 11, the operation detector 44 detects that the user has performed the operation to open and close the paper feeding tray 11 based on the result of the detection by the tray opening detecting sensor 22. When, for example, the user performs an operation to open and close the front door 12 or the side door 14, the operation detector 44 detects that the user has touched the front door 12 or the side door 14. Even when the user performs an operation to the paper delivering tray 13, the manual feeding tray 15 or the document placement part 16, the operation detector 44 is enabled to detect the operation unit 8 operated by the user based on the information output from the group of sensors 20.

The operation detector 44 includes an operation recording part 45. The operation recording part 45 records the user operation detected by the operation detector 44 as the operation information 34. FIG. 4 illustrates an example of the operation information 34. As illustrated in FIG. 4, the operation information 34 includes information 34a related to the user who performs the operation, information 34b related to the operation unit 8 operated by the user, information 34c related to date and time of the operation performed by the user and information 34d showing if the operation requires an alert.

Information that enables to identify the user who operated the operation unit 8 (for instance, a name and/or a user ID) is recorded as the information 34a related to the user. When, for example, the login user is identified by the user detector 40, the information that can identify the login user is recorded as the information 34a related to the user. The user may be detected by the user detector 40 based on the detection result by the human detecting sensor 7. In this case, it is not identified who the user around the information processing device 1 is. In this situation, when the user operation is detected by the user detector 40, the operation recording part 45 is not enabled to obtain the information that enables to identify the user. Thus, information showing that the user is unidentified is recorded as the information related to the user 34a.

Information that can specify the operation unit 8 operated by the user is recorded as the information 34b related to the operation unit 8. By referring to the information 34b related to the operation unit 8, the operation unit 8 operated by the user can be identified.

The date and time when the user operated the operation unit 8 is recorded as the information 34c related to date and time of the operation. By referring to the information 34c related to date and time of the operation, the time elapsed after the operation unit 8 is operated by the user to the present time can be identified.

When recording the user operation in the operation information 34, the operation recording part 45 records "YES" for the information 34d showing if the operation requires the alert. When the information 34d shows "YES," it is stated that the operation unit 8 operated by the previous user should be notified before another user uses the information processing device 1. When the information 34d showing if the operation requires the alert is updated to "NO," the operation information is not required to be notified to the user.

Every time the operation to one of the multiple operation units 8 is detected by the operation detector 44, the operation recording part 45 records the information related to the operation in the operation information 34. Hence, the information showing that the operation being performed to the operation unit 8 by the user is accumulated in the operation information 34.

Pathogens such as viruses or bacteria sometimes die after an elapse of a predetermined period of time even when they are attached to a part such as the operation unit 8. However, the time required for the pathogens to be dead depend on types of pathogens or materials of the operation unit 8. An administrator of the information processing device 1 may set in advance the period required for the pathogens to be dead for each of the multiple operation units 8. The predetermined period of time set in advance by the administrator may have already been elapsed after the operation date and time to the operation unit 8 recorded in the operation information 34. In this case, the operation recording part 45 is enabled to automatically delete the information from the operation information 34. To be more specific, when the pathogens attached to the operation unit 8 are dead, the information related to the operation unit 8 is automatically deleted from the operation information 34. Thus, the user who is trying to use the information processing device 1 is not unnecessarily notified.

Even when the pathogens are attached to the operation unit 8, the pathogens can be dead through disinfection by alcohol, for instance, of the operation unit 8. When the user disinfects the operation unit 8, the operation recording part 45 may be able to automatically delete the information relating to the operation unit 8 from the operation information 34. Even in this case, the user who is trying to use the information processing device 1 is not unnecessarily notified.

Instead of deleting the information relating to the operation unit 8 recorded in the operation information 34, the operation recording part 45 may update the information 34d showing if the operation requires the alert to "NO." In this case, the old information remains in the operation information 34. In order to avoid that, it is preferable to delete the information related to the operation unit 8 from the operation information 34 as described above.

Referring back to FIG. 3, the notifying unit 46 becomes operative when the user is detected by the user detector 40. The notifying unit 46 notifies the operation unit 8 operated by the previous user before the user touches the information processing device 1. More specifically, when the second user tries to use the information processing device 1 after the first user uses the information processing device 1, the notifying unit 46 notifies the second user of the operation unit 8 operated by the first user. To explain more in detail, after the use by the first user ends, the second user may be detected by the user detector 40. In such a case, the notifying unit 46 refers to the operation information 34 and notifies the operation unit 8 operated by the first user based on the operation information 34. The notifying unit 46 displays a screen for notification on the display unit 9 of the operational panel 5, for example, to perform the notification to the second user. The notification does not have to be performed by displaying the screen for notification. The notifying unit 46 may output voice to perform the notification to the second user, for instance. In the first preferred embodiment, an example of displaying the screen for notification on the display unit 9 is described.

Figure 5:
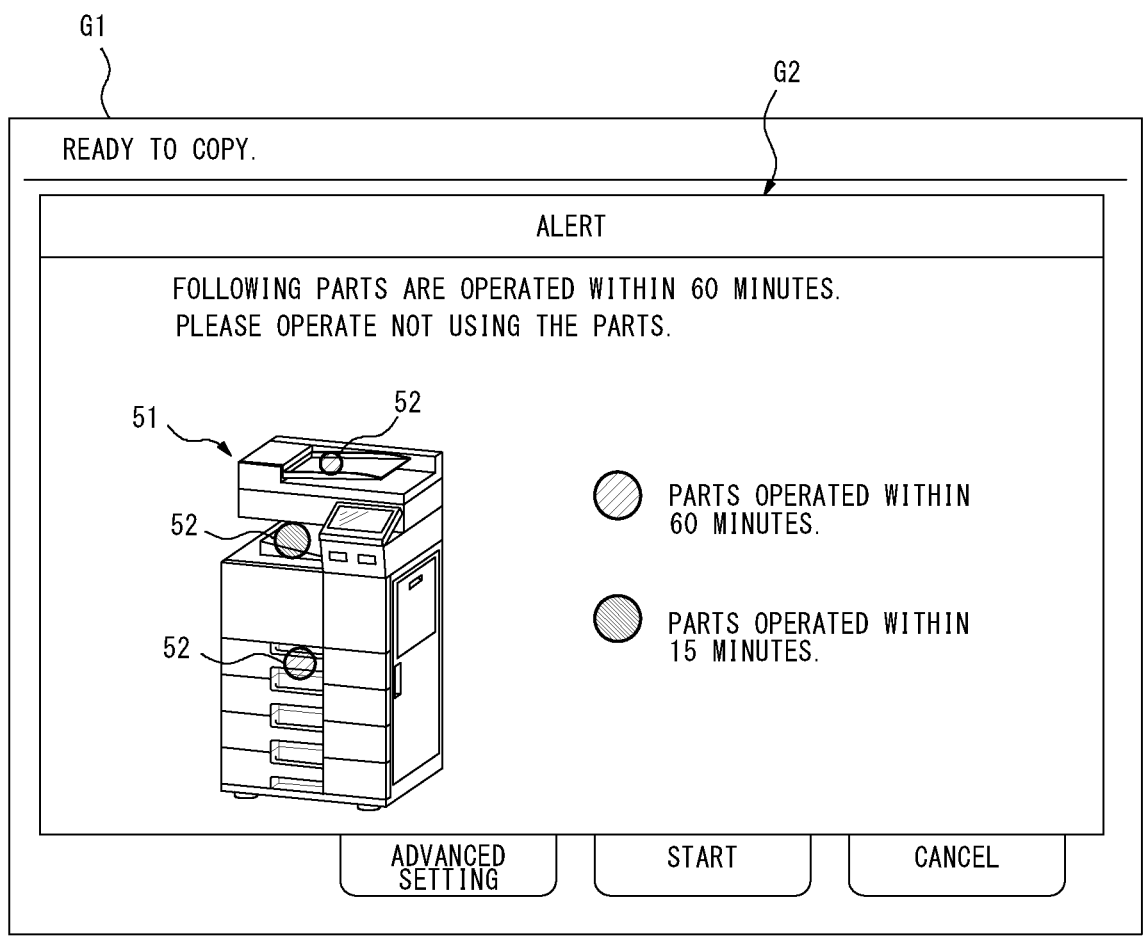
FIG. 5 illustrates an example of a screen displayed on a display unit.

FIG. 5 illustrates an example of a screen displayed on the display unit 9. After the first user finishes operating, for example, the second user may be detected by the user detector 40 before the predetermined period of time set in advance by the administrator elapses. In this case, the notifying unit 46 displays a screen G2 as illustrated in FIG. 5 on the display unit 9. The screen G2 pops up and is displayed on a job setting screen G1 displayed on the display unit 9 of the information processing device 1, for example. The screen G2 displayed by the notifying unit 46 on the display unit 9 notifies the second user of the operation unit 8 operated by the first user. The screen G2 thus alerts not to operate the same operation unit 8. The screen G2, for instance, includes an image 51 showing the information processing device 1. For displaying the screen G2, the notifying unit 46 displays a pointer image 52 that specifies the operation unit 8 operated by the first user on the image 51. In the example of FIG. 5, the period of time set in advance by the administrator is 60 minutes. The part operated by the first user within 60 minutes and the part operated within 15 minutes are specified by the different pointer images 52. Those pointer images 52 show the operation restricted parts to the second user.

The second user who tries to use the information processing device 1 and gets closer to the information processing device 1 sees the screen G2 displayed on the display unit 9, and he or she is enabled to know that the operation unit 8 that has been directly touched and operated by hands by the first user as the operation restricted part. As a result, the second user is enabled to operate the operation unit 8 that has not been touched by the first user. Thus, even when the first user is infected by pathogens, it can prevent the second user from being secondarily infected by operating the information processing device 1.

As illustrated in FIG. 5, the elapsed time after the first user performed the operation may differ. In this case, the display is carried out using the different pointer images 52. The second user, therefore, can presume the survival number of pathogens on each operation unit 8. Especially, the second user can try not to operate the operation unit 8 which has been operated by the first user not too long ago.

Figure 6:
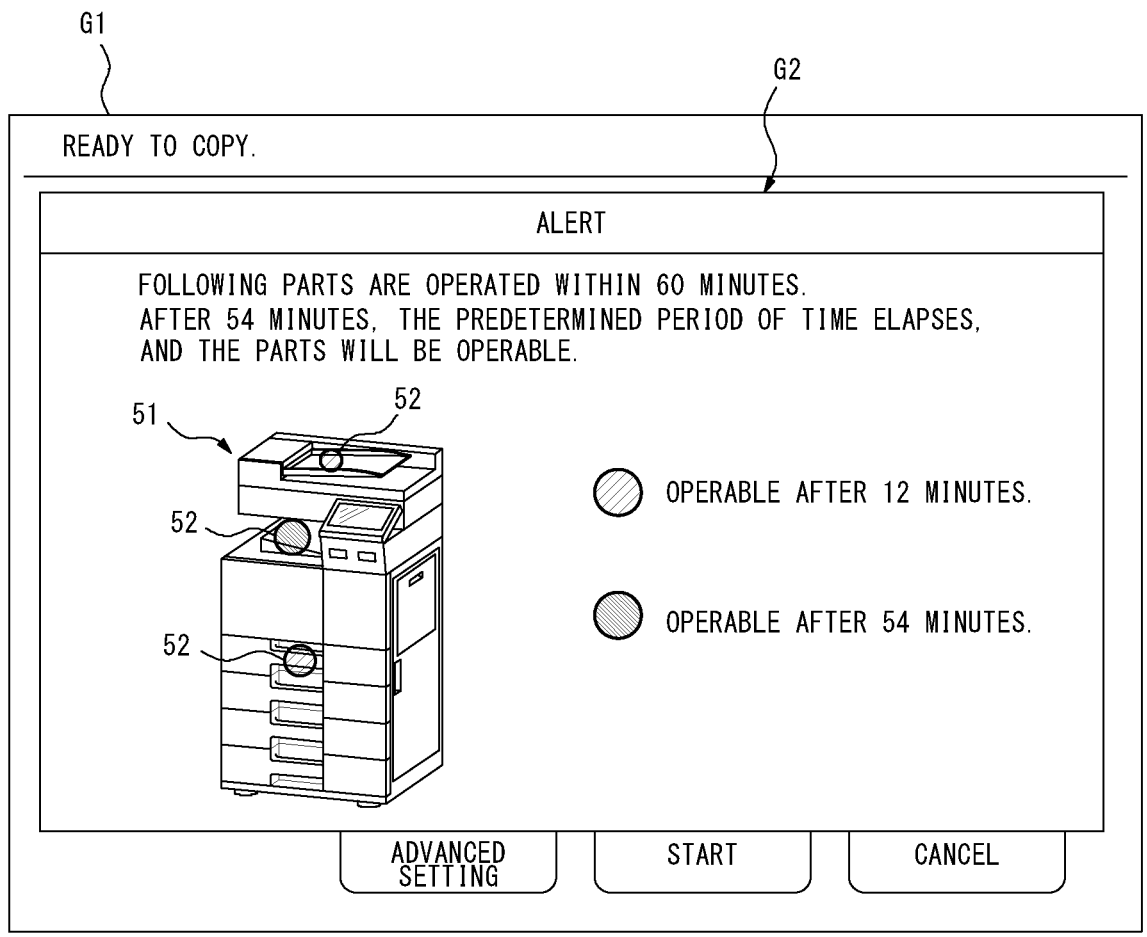
FIG. 6 illustrates an example of a screen displayed in a different manner.

FIG. 6 illustrates an example of a screen displayed differently from the example of FIG. 5. After the first user finishes his or her operation, the second user may be detected by the user detector 40 before the predetermined period of time set in advance by the administrator elapses, for example. In such a case, the notifying unit 46 may display the screen G2 as illustrated in FIG. 6 on the display unit 9. The screen G2 of FIG. 6 includes the image 51 showing the information processing device 1 similar to FIG. 5. The pointer image 52 specifying the operation unit 8 operated by the first user is displayed on the image 51. The pointer image 52 displayed in the screen G2 of FIG. 6 shows the time left until the pathogens attached to the operation unit 8 operated by the first user die and the second user is allowed to operate. The second user, therefore, is allowed to know the time required for the operation unit 8 operated by the first user to be ready for the operation by seeing the screen G2 of FIG. 6. Even the screen G2 of FIG. 6 enables to prevent the second user from being secondarily infected by operating the information processing device 1.

Figure 7:
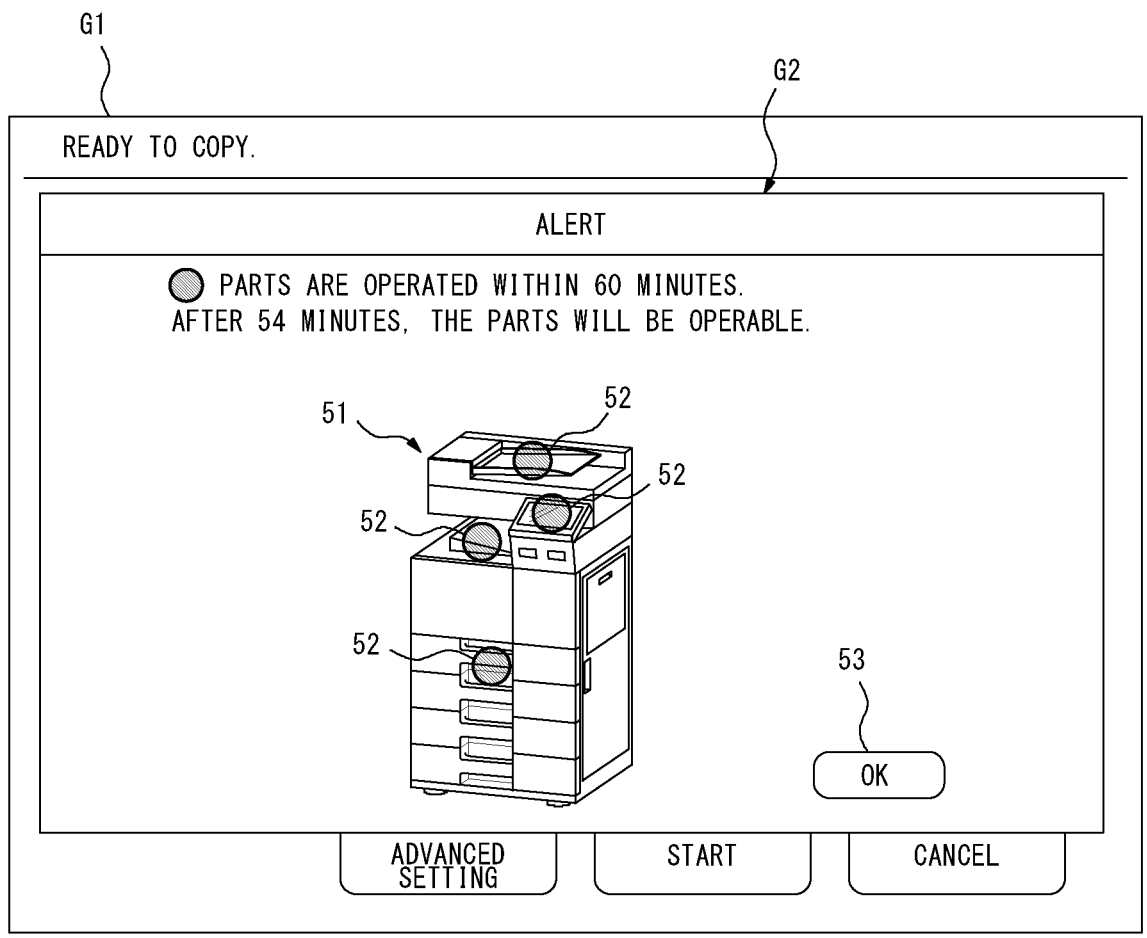
FIG. 7 illustrates an example of a screen displayed in a different manner.

FIG. 7 illustrates an example of a screen displayed differently from the examples of FIGS. 5 and 6. After the first user finishes his or her operation, the second user may be detected by the user detector 40 before the predetermined period of time set in advance by the administrator elapses, for example. In such a case, the notifying unit 46 may display the screen G2 as illustrated in FIG. 7 on the display unit 9. The screen G2 of FIG. 7 includes the image 51 showing the information processing device 1 similar to FIGS. 5 and 6. The pointer image 52 specifying the operation unit 8 operated by the first user is displayed on the image 51. The pointer image 52 displayed in the screen G2 of FIG. 7 shows the time left until the pathogens attached to the operation unit 8 operated by the first user die and the second user is allowed to operate. In addition, in the screen G2 of FIG. 7, an operation button 53 operable for the second user is displayed. The operation button 53 is operated when, for example, the second user confirms the operation unit 8 operated by the first user.

Once the operation button 53 is operated by the second user, the notifying unit 46 switches the screen G2 displayed on the display unit 9 to be hidden. More specifically, the display of the operation unit 8 operated by the first user is to be ended. As a result, the job setting screen G1 is displayed on the display unit 9. Hence, the second user is allowed to perform the job setting operation by operating the operational panel 5. In this case, however, the second user may touch the same operation unit 8 as the one touched by the first user. When the second user operates the operation button 53 after checking the screen G2 of FIG. 7, he or she needs to prevent the secondary infection by washing his or her hands properly after the use of the information processing device 1, for instance.

If the operation by the second user is completely restricted when the predetermined period of time has not been elapsed after the use by the first user, the second user is not enabled to use the information processing device 1, resulting in lower convenience. When the screen G2 of FIG. 7 is displayed and operation button 53 is operated by the second user, the display of the screen G2 ends and the operation by the second user is accepted so that reduction in convenience can be avoided.

Once the second user is identified as the log-in user by the authenticator 41 of the user detector 40, the notifying unit 46 is enabled to identify the second user. If the first user is logging into the information processing device 1 for using the information processing device 1, the information 34*a* related to the first user is recorded in the operation information 34. In this case, the notifying unit 46 can also identify the first user. Once the second user is identified as the log-in user, the notifying unit 46 determine if the second user is the same user as the first user.

When the second user is different from the first user, the notifying unit 46 informs the second user not to touch the operation unit 8 operated by the first user.

Figure 8:
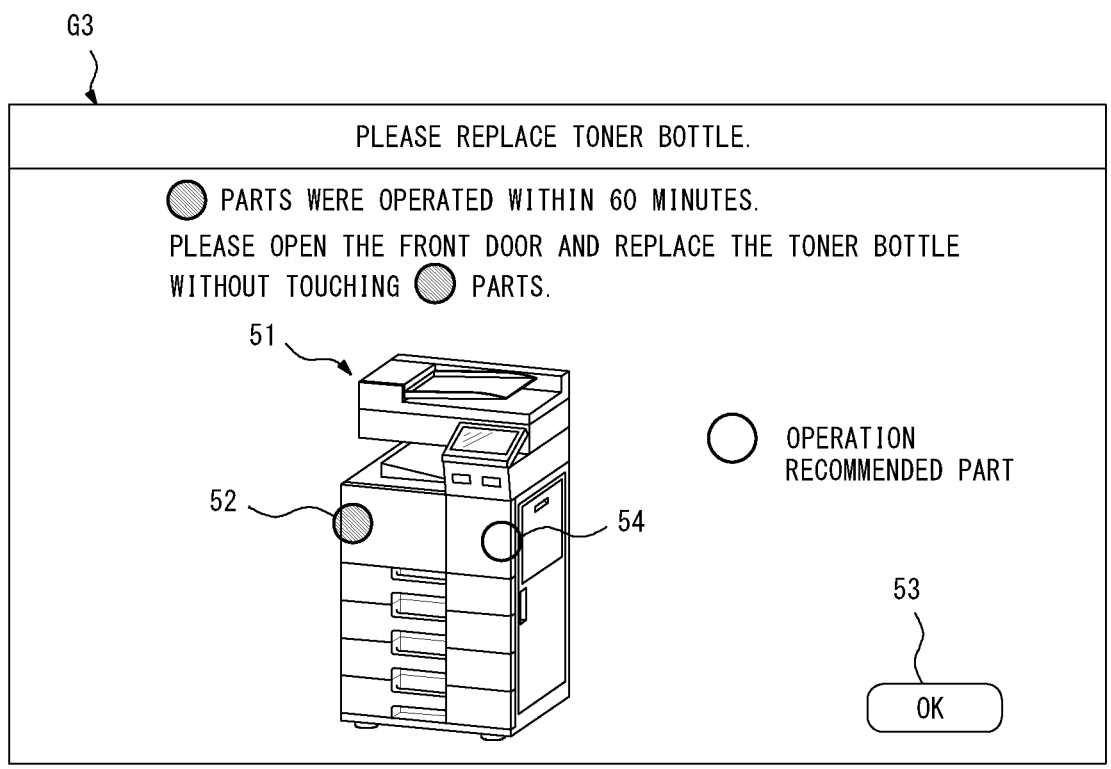
FIG. 8 illustrates an example of a screen to guide the operation of an operation unit different from the operation unit operated by a first user.

FIG. 8 illustrates an example of a screen to guide the operation of the operation unit 8 different from the operation unit 8 operated by the first user. The toner empty may be detected by the job controller 43 at the time of log-in to the information processing device 1 by the second user, for example. In this case, the notifying unit 46 displays a screen G3 on the display unit 9 as illustrated in FIG. 8. The screen G3 prompts the replacement of the toner bottle. To be more specific, the screen G3 informs the second user to open the front door 12 to replace the toner bottle. The notifying unit 46 reads the operation information 34 and guides to open the front door 12 by operating the part different from the part touched by the first user if the first user has performed the operation to open the front door 12. The screen G3 of FIG. 8 includes the image 51 showing the information processing device 1 as well as the aforementioned screen G2. The pointer image 52 specifying the operation unit 8 operated by the first user is displayed on the image 51. In addition, a pointer image 54 that specifies the operation unit 8 not operated by the first user as an operation recommended part is displayed on the image 51. In order to realize this display, a sensor capable of identifying the user operated part should be mounted as the door opening detecting sensor 23. As the screen G3 of FIG. 8 is displayed, the second user is enabled to operate the operation recommended part different from the part touched by the first user to replace the toner bottle. Even when the first user is infected by pathogens, it can prevent the second user from being secondarily infected.

When the second user and the first user are the same, it may not be necessary for the notifying unit 46 to notify the second user of the operation unit 8 operated by the first user. If the second user (the first user) is infected by pathogens and he or she operates the operation unit 8 different from the operation unit 8 previously operated, there will be a greater number of the operation units 8 to which pathogens are attached in the information processing device 1. Thus, more operation units 8 cannot be touched by another user.

When the second user and the first user are the same, the notifying unit 46 preferably notify the second user of the operation unit 8 the same as the operation unit 8 operated by the first user as the operation recommended part. As a result, even when the second user (the first user) is infected by pathogens, the infected part is not spread and the operation can be performed.

Figure 9:
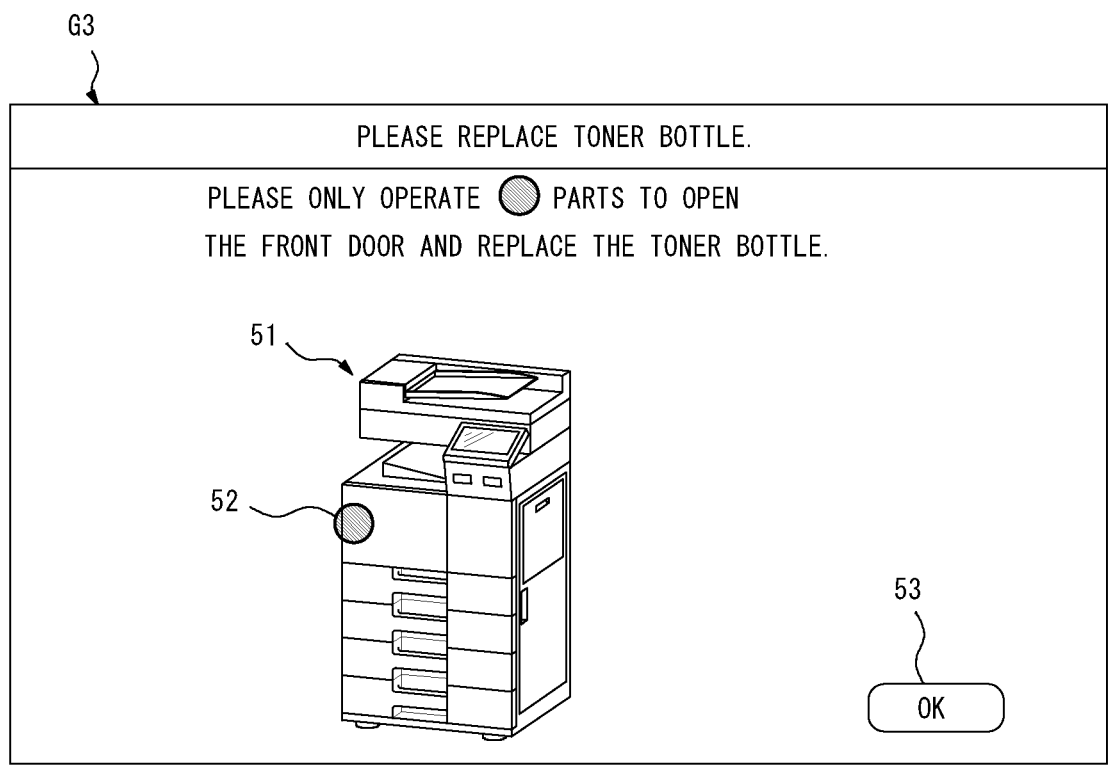
FIG. 9 illustrates an example of a screen to guide the operation of the operation unit the same as the operation unit operated by the first user.

FIG. 9 illustrates an example of a screen to guide the operation of the operation unit 8 the same as the operation unit 8 operated by the first user. The toner empty may be detected at the time of log-in to the information processing device 1 by the second user who is the same user as the first user, for example. In this case, the notifying unit 46 displays the screen G3 on the display unit 9 as illustrated in FIG. 9. The screen G3 prompts the replacement of the toner bottle. The notifying unit 46 reads the operation information 34 and guides to open the front door 12 by operating the part the same as the part touched by the first user if the first user has performed the operation to open the front door 12. The screen G3 of FIG. 9 includes the image 51 showing the information processing device 1 as well as the aforementioned screen G2. The pointer image 52 specifying the operation unit 8 operated by the first user is displayed on the image 51. The pointer image 52 shows the operation unit 8 operated by the first user as the operation recommended part. As the screen G3 of FIG. 9 is displayed, the second user is enabled to operate the part touched by the first user to replace the toner bottle. Thus, the second user is enabled to perform the operation without an increase in the number of the operation units 8 to which pathogens are possibly attached in the information processing device 1.

Figure 10:
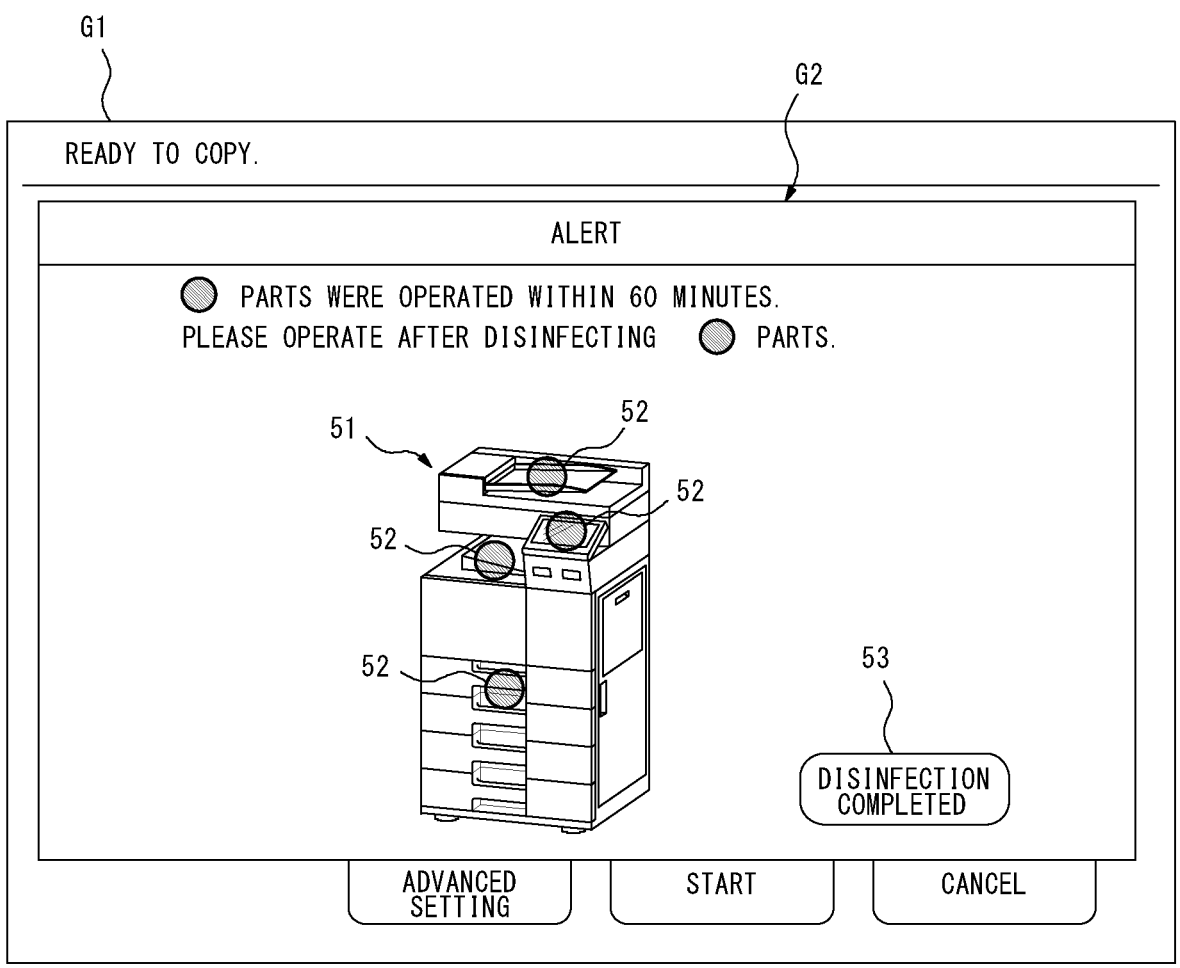
FIG. 10 illustrates an example of a screen guiding a second user to operate after disinfection.

When notifying the second user of the operation unit 8 operated by the first user, the notifying unit 46 may guide to operate after disinfecting the operation unit 8 operated by the first user. FIG. 10 illustrates an example of the screen guiding the second user to operate after the disinfection. When, for example, the second user is detected by the user detector 40, the notifying unit 46 may display the screen G2 as illustrated in FIG. 10 on the display unit 9. The screen G2 of FIG. 10 includes the image 51 showing the information processing device 1. The pointer image 52 specifying the operation unit 8 operated by the first user is displayed on the image 51. The screen G2 of FIG. 10 includes a message guiding the second user to operate after disinfecting the operation unit 8 operated by the first user. Thus, the second user is allowed to know the disinfection of the operation unit 8 shown by the pointer image 52 is required. The second user can use the information processing device 1 after the disinfection.

An operation button 55 to be operated after the disinfection by the second user is displayed on the screen G3 of FIG. 10. After completing the disinfection, the second user operates the operation button 55. When the operation button 55 is operated by the second user, the notifying unit 46 recognizes the completion of the disinfection and switches the screen G2 displayed on the display unit 9 to be hidden. More specifically, the display of the operation unit 8 operated by the first user is ended. As a result, the job setting screen G1 is displayed on the display unit 9. The second user is allowed to perform the job setting operation by operating the operational panel 5. As described above, also by guiding the disinfection of the operation unit 8 to the second user, the secondarily infection of the second user by pathogens can be avoided.

When the disinfection by the second user is carried out, the notifying unit 46 notifies the operation recording part 45 of the disinfected operation unit 8. As a result, the operation recording part 45 is enabled to update the operation information 34 by deleting information related to the disinfected operation unit 8 from the operation information 34, or rewriting the information 34*d* corresponding to the disinfected operation unit 8 to "NO." The operation information 34 is updated as described above after the completion of the disinfection so that the notification due to the operation of the operation unit 8 by the first user is not performed. If the operation unit 8 is operated by the second user after the disinfection, information related to the operation by the second user is recorded as the operation information 34. When a third user uses the information processing device 1 after the second user finishes using, the operation unit 8 operated by the second user is notified.

Figure 11:
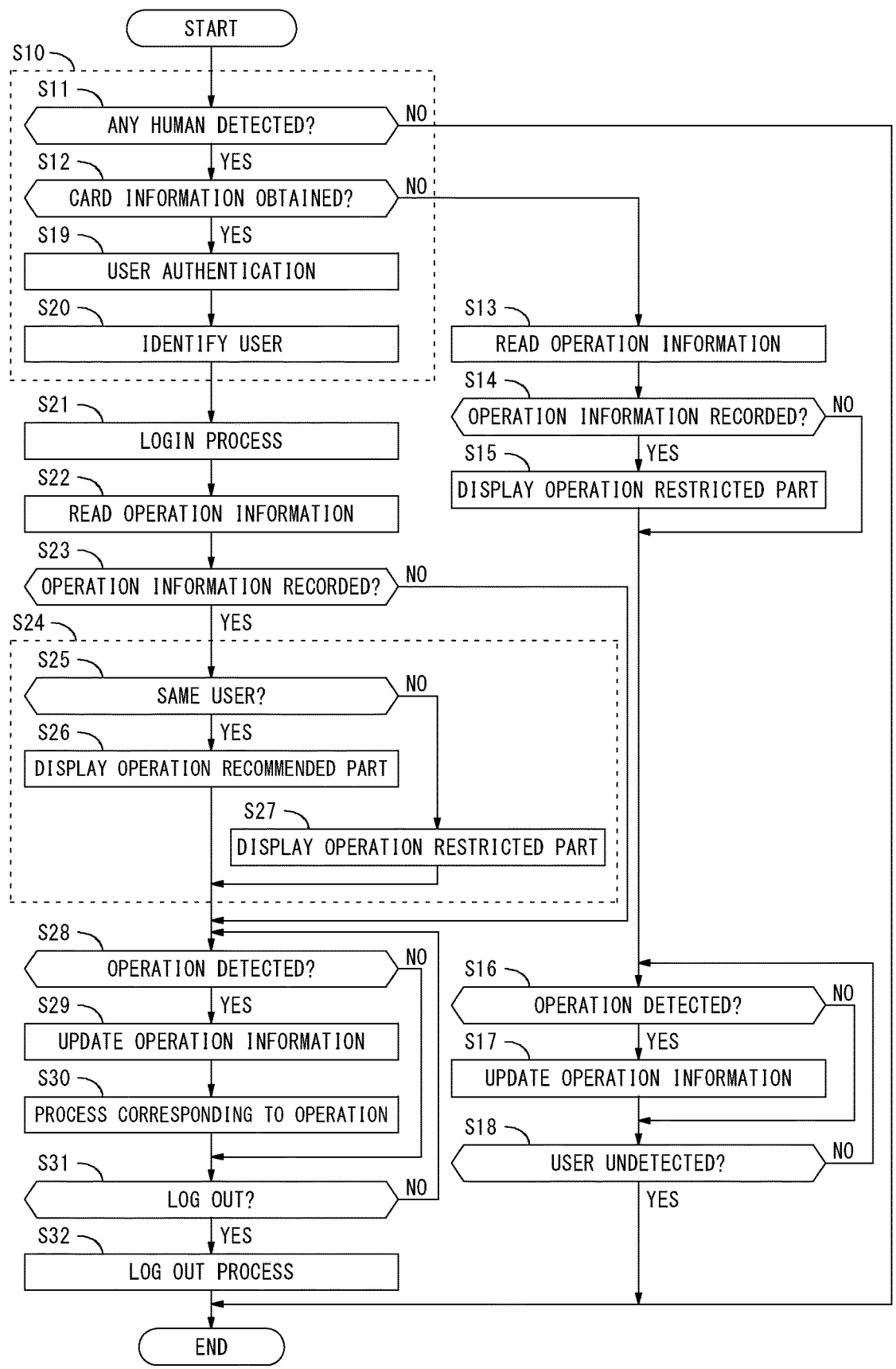
FIG. 11 illustrates a flow diagram explaining an exemplary procedure of a process performed by the information processing device.

A process sequence performed in the information processing device 1 is explained next. FIG. 11 illustrates a flow diagram explaining an exemplary procedure of a process performed by the information processing device 1. This process of FIG. 11 is performed when the user uses the information processing device 1. The process is performed when the program 33 is executed by the CPU 31 of the controller 30, for example. This process of FIG. 11 is repeatedly performed in the information processing device 1.

Upon the start of the process, the information processing device 1 carries out the user detection (step S10). After starting the user detection (step S10), the information processing device 1 determines if the human detecting sensor 7 has detected a human (step S11). When the human detecting sensor 7 does not detect the human (when a result of step S11 is NO), the information processing device 1 does not detect the user. In this case, the process in the information processing device 1 ends. When the human detecting sensor 7 detects the human (when a result of step S11 is YES), it means the human exists around the information processing device 1, and the information processing device 1 detects the human as the user (the second user) of the information processing device 1.

When the human detecting sensor 7 detects the user (when a result of step S11 is YES), the information processing device 1 determines if the card information has been obtained through the card reader 6 (step S12). If the card information is not obtained (when a result of step S12 is NO), the process in the information processing device 1 moves on to step S13.

In step S13, the information processing device 1 notifies the user who exists around the information processing device 1 (the second user) of the operation unit 8 operated by the user previously used the information processing device 1 (the first user). More specifically, the information processing device 1 reads the operation information 34 (step S13), and determines if the information related to the operation performed by the user who has previously used the information processing device 1 (the first user) is recorded in the operation information 34 (step S14). When the information related to the operation performed by the user who has previously used the information processing device 1 (the first user) is recorded in the operation information 34 (when a result of step S14 is YES), the information processing device 1 displays the screen G2 in which the operation unit 8 operated by the user who has previously used the information processing device 1 is shown as the operation restricted part on the display unit 9 (step S15). As a result, the second user who is trying to operate information processing device 1 can be notified the operation unit 8 operated by the user who has previously used the information processing device 1 (the first user) without logging into the information processing device 1. When the information related to the operation performed by the user who has previously used the information processing device 1 is not recorded in the operation information 34 (when a result of step S14 is NO), the information processing device 1 does not display the screen G2 on which the operation restricted part is shown.

The information processing device 1 determines if the operation performed by the second user who has not logged into the information processing device 1 is detected (step S16). When the operation performed by the second user is detected (when a result of step S16 is YES), the information processing device 1 records the information related to the operation in the operation information 34, and updates the operation information 34 (step S17). For updating the operation information 34, the information processing device 1 identifies the operation unit 8 operated by the second user, and records the information related to the operation unit 8, the information related to the date and time of the operation performed by the second user and the information showing that the operation is a target of an alert in the operation information 34. As the second user is not identified, the information that enables the identification of the user is not recorded in the operation information 34. If the operation performed by the second user is not detected (when a result of step S16 is NO), the information processing device 1 does not update the operation information 34.

If the user has continuously been detected by the human detecting sensor 7 (when a result of step S18 is NO), the information processing device 1 repeatedly carries out the process in steps S16 to S17. If the second user repeatedly perform the operation to the information processing device 1 even when the second user is not logging into the information processing device 1, the information related to the operations is recorded in the operation information 34. If the human detecting sensor 7 does not detect the user (when a result of step S18 is YES), the information processing device 1 completes the process.

After the user is detected by the human detecting sensor 7 (when a result of step S11 is YES), the card information may be obtained through the card reader 6 (when a result of step S12 is YES). In this case, the information processing device 1 performs the user authentication to authenticate the second user based on the user information included in the card information (step S19), and identifies the second user who is trying to use the information processing device 1 (step S20). The information processing device 1 performs the login process of the identified second user as the login user. The information processing device 1 then shifts to the login state (step S21).

The information processing device 1 reads the operation information 34 in the storage 32 (step S22), and determines if the information related to the operation performed by the user who previously used the information processing device 1 (first user) is recorded (step S23). When the information related to the operation performed by the first user who previously used the information processing device 1 is recorded in the operation information 34 (when a result of step S23 is YES), the information processing device 1 performs the notification process to notify the second user of the operation unit 8 used by the first user (step S24). When the information related to the operation performed by the first user who previously used the information processing device 1 is not recorded in the operation information 34 (when a result of step S23 is NO), the information processing device 1 does not perform the notification process (step S24), and moves on to the process in step S28.

Upon starting the notification process (step S24), the information processing device 1 determines if the first user and the second user are the same (step S25). When the first user and the second user are the same (when a result of step S25 is YES), the information processing device 1 displays the screen on which the operation unit 8 operated by the first user is shown as the operation recommended part as illustrated in FIG. 9, for example (step S26).

As a result, the second user is enabled to know which operation unit he or she has previously operated. As he or she operates the same operation unit 8, increase in the number of pathogens can be restricted. When the first user and the second user are not the same (when a result of step S25 is NO), the information processing device 1 displays the screen on which the operation unit 8 operated by the first user is shown as the operation recommended part (step S27). The information processing device 1 may display the operation unit 8 that is not operated by the first user as the operation recommended part as illustrated in FIG. 8. The second user is then allowed to perform the operation without touching the operation unit 8 previously operated by the first user, which prevents the secondary infection via the information processing device 1.

The information processing device 1 determines if the operation performed by the second user is detected (step S28). When the operation performed by the second user is detected (when a result of step S28 is YES), the information processing device 1 records the information related to the operation in the operation information 34, and updates the operation information 34 (step S29). For updating the operation information 34, the information processing device 1 records the information that can identify the second user, the information related to the operation unit 8 operated by the second user, the information related to the date and time of the operation performed by the second user and the information showing that the operation is the target of the alert in the operation information 34. The information processing device 1 then carries out the processing corresponding to the operation performed by the second user (step S30). The information processing device 1, for example, carries out the processing to apply the job setting operation performed by the second user and/or starts the processing of the job. If the operation performed by the second user is not detected (when a result of step S28 is NO), the information processing device 1 does not perform the process in steps S29 and S30.

The information processing device 1 determines if the state should be shifted to the log out state from the login state (step S31). When detecting the operation to logout performed by the second user, or the predetermined period of time has elapsed without detecting the operation performed by the second user, for example, the information processing device 1 determines to shift the state to the logout state. When not shifting the state to the logout state (when a result of step S31 is NO), the information processing device 1 returns to the process in step S28 to repeatedly perform the aforementioned process. For shifting to the log out state (when a result of step S31 is YES), the information processing device 1 carries out the logout process to shift to the log out state (step S32), and completes the process.

Figure 12:
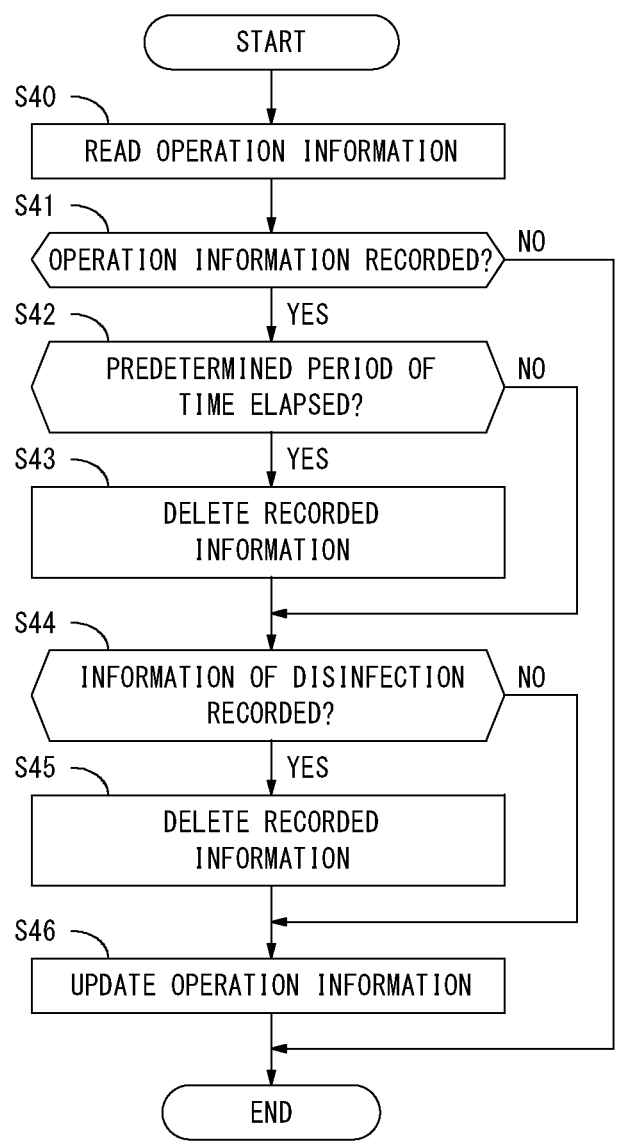
FIG. 12 illustrates a flow diagram explaining an exemplary procedure of a process performed by the information processing device.

A process sequence performed when the information processing device 1 automatically updates the operation information 34 is explained next. FIG. 12 illustrates a flow diagram explaining an exemplary procedure of a process performed by the information processing device 1. This process of FIG. 12 is repeatedly performed in the information processing device 1 at predetermined time intervals. The process is performed when the program 33 is executed by the CPU 31 of the controller 30, for example.

Upon the start of the process, the information processing device 1 reads the operation information 34 in the storage 32 (step S40). The information processing device 1 determines if the information related to the operation performed by the first user who has previously used the information processing device 1 is recorded in the operation information 34 (step S41). When the information related to the operation performed by the first user who has previously used the information processing device 1 is not recorded (when a result of step S41 is NO), the process in the information processing device 1 ends.

When the information related to the operation performed by the first user who has previously used the information processing device 1 is recorded (when a result of step S41 is YES), the information processing device 1 determines if the predetermined period of time set in advance by the administrator has elapsed after the operation performed by the first user (step S42). If the predetermined period of time has elapsed (when a result of step S42 is YES), it is considered that pathogens attached to the operation unit 8 have already died. The information processing device 1 then deletes the information from the operation information 34 (step S43). If the predetermined period of time has not elapsed (when a result of step S42 is NO), the information processing device 1 does not perform the process in step S43.

The information processing device 1 determines if the information related to the operation unit 8 disinfected by the second user is recorded in the operation information 34 (step S44). When the information related to the operation unit 8 disinfected by the second user is recorded in the operation information 34 (when a result of step S44 is YES), the information processing device 1 deletes the information from the operation information 34 (step S45). When the information related to the operation unit 8 disinfected by the second user does not exist (when a result of step S44 is NO), the information processing device 1 does not perform the process in step S45.

The information processing device 1 then updates the operation information 34 in the storage 32 (step S46), and completes the process.

As described above, when the time required for pathogens attached to the operation unit 8 to be dead has elapsed, or the disinfection of the operation unit 8 is performed by the user, the information recorded in the operation information 34 is deleted and the operation information 34 is updated. Thus, after the update, the notification is not made to the user when the user uses the information processing device 2. When the user uses the information processing device 1 after the operation information 34 is updated, he or she is enabled to perform the usual operation to the information processing device 1 without considering the secondary infection.

As described above, the information processing device 1 of the first preferred embodiment includes the user detector 40, the operation detector 44, the storage 32 and the notifying unit 46. The user detector 40 detects the user, and the operation detector 44 detects the operation unit 8 operated by the first user from among the multiple operation units 8 when the first user is being detected by the user detector 40. The operation information 34 in which the operation unit 8 detected by the operation detector 44 is recorded is stored in the storage 32. When the user detector 40 detects the second user after the operation is performed by the first user, the notifying unit 46 reads the operation information 34 in the storage 32, and notifies the second user of the operation unit 8 operated by the first user. Especially the notifying unit 46 notifies the second user of the operation unit 8 operated by the first user before the operation is performed by the second user. The second user can operate the operation unit 8 without directly touching the operation unit 8 operated by the first user by hands so that the secondary infection via the information processing device 1 can be prevented.

Second Preferred Embodiment

Figure 13:
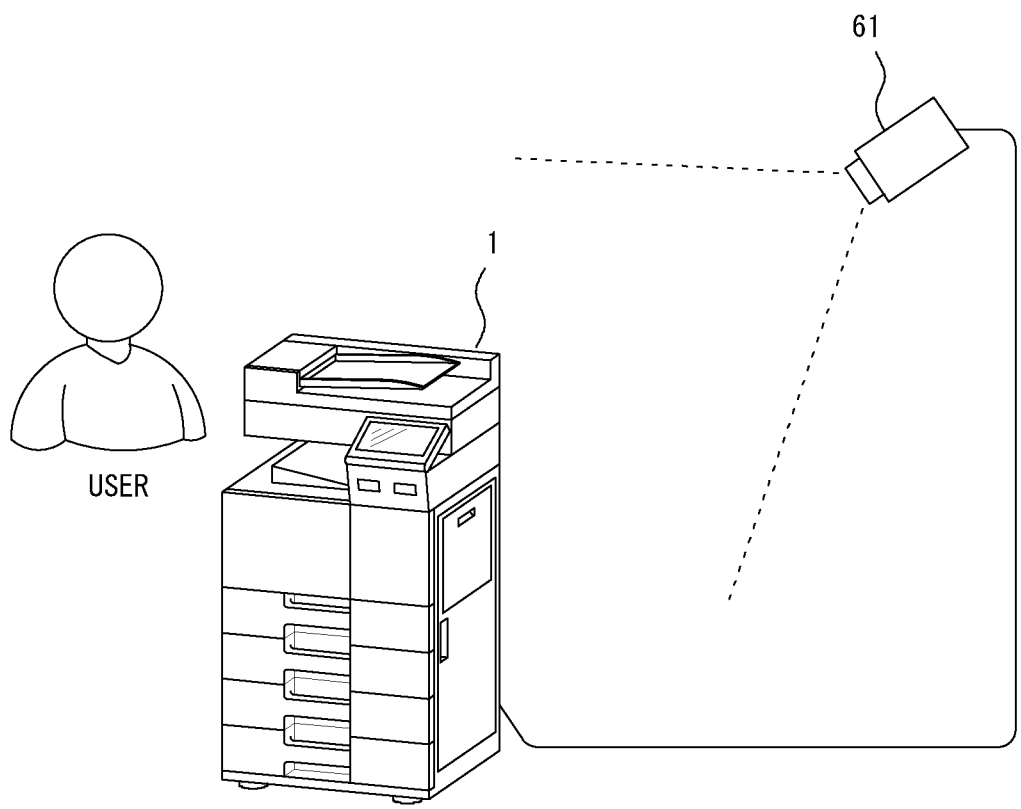
FIG. 13 illustrates an exemplary overall structure of the information processing device in which the second preferred embodiment of the present invention may be practiced.

The second preferred embodiment of the present invention is explained next. FIG. 13 illustrates an exemplary overall structure of the information processing device 1 in which the second preferred embodiment of the present invention may be practiced. The information processing device 1 of FIG. 13 is connected to a camera 61 which is externally installed. The camera 61 photographs an image that has a photographing range around the information processing device 1. The information processing device 1 includes an image obtaining unit connected to the camera 61 to obtain the image photographed by the camera 61.

The information processing device 1 that has the aforementioned structure analyses the image photographed by the camera 61 so that the information processing device 1 is enabled to detect if there is a person around the information processing device 1. The user detector 40 analyzes the image photographed by the camera 61 to detect the person exists around the information processing device 1 as the user. Thus, the human detecting sensor 7 explained in the first preferred embodiment is not necessary to be provided. The user detector 40 extracts a face image of the person who is in the image photographed by the camera 61, and performs a face authentication so that the user detector 40 is enabled to identify the user who is around the information processing device 1. In the second preferred embodiment, the number of the cases where the notification is made without identifying who the second user is reduces. In the other words, the information processing device 1 is enabled to adequately determine if the second user is the same as the first user, and appropriately display the operation restricted part or the operation recommended part.

The information processing device 1 of the second preferred embodiment analyses the image photographed by the camera 61 so that the information processing device 1 is enabled to specify the operation unit 8 operated by the first user. The operation detector 44 analyzes the image photographed by the camera 61 so that the operation unit 8 operated by the first user can be detected. Hence, the group of sensors 20 does not have to include as many sensors as those described in the first preferred embodiment.

The structure and the process except for the points explained in the second preferred embodiment are the same as ones explained in the first preferred embodiment. The information processing device 1 connected to the camera 61 has the same effect as that in the first preferred embodiment.

Third Preferred Embodiment

Figure 14A:
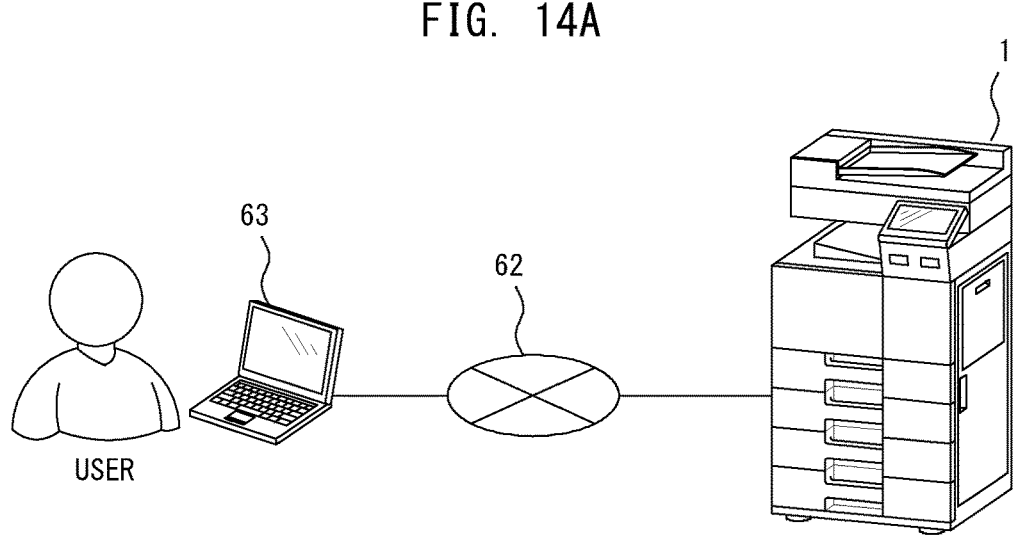
FIGS. 14A and 14B illustrate examples when a terminal device is connected to the information processing device.
Figure 14B:
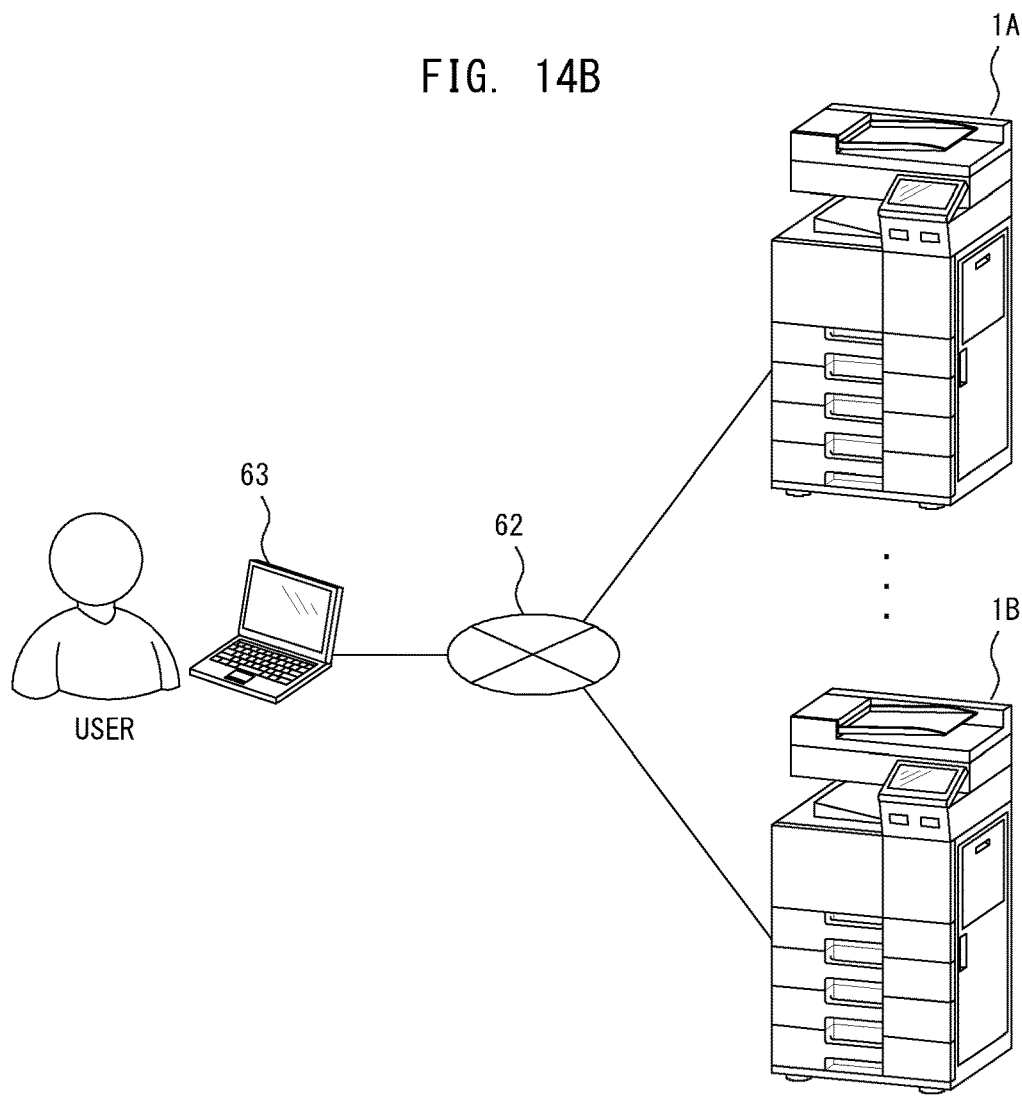

The third preferred embodiment of the present invention is explained next. FIGS. 14A and 14B illustrate examples when a terminal device 63 is connected to the information processing device 1. As illustrated in FIG. 14A, for example, the information processing device 1 of the third preferred embodiment is connected to a network 62 such as LAN (Local Area Network). The terminal device 63 used by the user is connected to the network 62. The terminal device 63 is a device such as a personal computer (PC) or a tablet terminal.

It is assumed that the user uses the terminal device 63 to send the print job to the information processing device 1 with the structure as illustrated in FIG. 14A. In this case, a printer driver is started up in the terminal device 63. When the printer driver is started up in the terminal device 63, a setting screen for setting the print job is displayed on a display unit of the terminal device 63. The terminal device 63 communicates with the information processing device 1, and obtains information such as a status of the information processing device 1. The terminal device 63 then displays the setting screen to which the obtained status information is applied.

For notifying the printer driver of the terminal device 63 of the information such as the stratus, the information processing device 1 notifies the printer driver of the information related to the operation unit 8 operated by the first user based on the operation information 34 stored in the storage 32. The information processing device 1 enables the printer driver to display the screen for the notification described in the first preferred embodiment, and notifies the user who is trying to send the print job of the operation unit 8 operated by the first user. Hence, the user is enabled to know the operation unit 8 that cannot be operated before sending the print job.

As illustrated in FIG. 14B, multiple information processing devices 1A and 1B may be connected to the network 62. In such a case, the user may determine the secondary infection is possible by touching the information processing device 1A when he or she tries to send the print job to the information processing device 1A and sees the displayed screen for the notification. In this case, the user is enabled to switch the destination of the print job to the information processing device 1B from the information processing device 1A before sending the print job. As a result, the secondary infection to the user can be prevented.

The structure and the process except for the points explained in the second preferred embodiment are the same as ones explained in the first preferred embodiment. The information processing device 1 also enables the printer driver to display the screen for the notification has the same effect as that in the first preferred embodiment.

Although the embodiments of the present invention have been described and illustrated in detail, it is clearly understood that the same is by way of illustration and example only and not limitation, the scope of the present invention should be interpreted by terms of the appended claims.

(Modifications)

While the preferred embodiments of the present invention have been described above, the present invention is not limited to the preferred embodiments. Various modifications may be applied to the present invention.

In the above-described first preferred embodiment, the card authentication is described as an example of the user authentication. The manner of authentication does not have to be the card authentication. The authentication may be carried out by voice authentication or biological authentication.

In the above-described first preferred embodiment, it is determined whether or not the first user is the same as the second user based on a result of the user authentication. The determination whether or not the users are the same does not have to be made based on the result of the user authentication. The information processing device 1 may determine the second user is the same as the first user when an interval between the operations to at least one of the multiple operation units 8 is less than a predetermined period of time. In this case, if the interval between the operations to at least one of the multiple operation units 8 is more than the predetermined period of time, the second user is determined as the different from the first user.

It is common that multiple operation buttons operable for the user are shown in the screen such as the job setting screen and the screen is displayed on the display unit 9 of the operational panel 5, which was not specifically stated in the above-described preferred embodiments. The information processing device 1 may distinguish and display the operation button operated by the first user and the operation button not operated by the first user among the multiple operation buttons displayed on the display unit 9, and notify the second user of the operation button operated by the first user.

In the above-described preferred embodiments, the information processing device 1 is constructed by an image processing device such as the MFP. The information processing device 1 does not have to one of the MFPs. The information processing device 1 may be a scanner or a printer. More specifically, the information processing device 1 can be any device if it is shared and used by multiple users.

In the above-described preferred embodiments, the program 33 executed by the CPU 31 of the controller 30 is stored in advance in the storage 32. The program 33 does not always have to be stored in the storage 32 in advance. To be more specific, the program 33 may be installed in the information processing device 3 after the shipping of the information processing device 1. In this case, the program 33 may be provided over an internet in a manner that enables a user to download, or may be provided in a manner that is recorded on a computer readable recording medium such as a CD-ROM.

What is claimed is:

1. An information processing device including multiple operation units operable for a user, comprising:
   a storage; and
   a hardware processor that:
   detects the user;
   detects the operation unit operated by a first user from among the multiple operation units when the first user is being detected;
   stores operation information in which operation unit is recorded in the storage;
   reads the operation information in the storage and notifies a second user of the operation unit operated by the first user when the second user is detected; and
   when the detected second user is the same as the first user, the hardware processor does not notify the second user of the operation unit operated by the first user.

2. The information processing device according to claim 1, further comprising:
   a display part on which various information is displayed, wherein
   the hardware processor displays the operation unit operated by the first user on the display part.

3. The information processing device according to claim 2, wherein
   the hardware processor displays a time left until an elapse of a predetermined period of time on the display part when the second user is detected after the first user finishes the operation but before the predetermined period of time elapses.

4. The information processing device according to claim 2, wherein
   the hardware processor displays an alert not to operate the operation unit operated by the first user until a predetermined period of time elapses on the display part when the second user is detected after the first user finishes the operation before the predetermined period of time elapses.

5. The information processing device according to claim 2, wherein
   the hardware processor displays a guidance to disinfect prior to the operation of the operation unit operated by the first user on the display part when the second user is detected after the first user finishes the operation but before a predetermined period of time elapses.

6. The information processing device according to claim 2, wherein
   the hardware processor displays a guidance to operate the operation unit other than the operation unit operated by the first user on the display part when the second user is detected after the first user finishes the operation but before a predetermined period of time elapses.

7. The information processing device according to claim 2, wherein
   the hardware processor ends the display of the operation unit operated by the first user on the display part based on the operation performed by the second user.

8. The information processing device according to claim 2, wherein
   when the detected second user is the same as the first user, the hardware processor displays a guidance to operate the same operation unit as the operation unit operated by the first user.

9. The information processing device according to claim 1, wherein the hardware processor further:
   authenticates the user, wherein
   the hardware processor determines if the second user is the same as the first user based on a result of the authentication.

10. The information processing device according to claim 1, wherein
    when an interval between operations to at least one of the multiple operation units is shorter than a predetermined period of time, the hardware processor determines the second user is the same as the first user.

11. The information processing device according to claim 1, further comprising:
    a human detecting sensor that detects a human exists within a range of a predetermined distance from the information processing device, wherein
    the hardware processor detects the user based on a result of the detection by the human detecting sensor.

12. The information processing device according to claim 1, wherein
    the multiple operation units include a paper feeding tray openable to a device body, and
    the hardware processor detects the operation unit operated by the first user based on a result of a detection performed by a tray opening detecting sensor that detects the paper feeding tray is opened or closed.

13. The information processing device according to claim 1, wherein
    the multiple operation units include a document placement part on which a document is placed, and
    the hardware processor detects the operation unit operated by the first user based on a result of a detection performed by a tray opening detecting sensor that detects the document is placed on document placement part.

14. The information processing device according to claim 1, wherein
    the multiple operation units include a paper delivering tray that delivers a sheet on which an image is printed, and
    the hardware processor detects the operation unit operated by the first user based on a result of a detection performed by a sheet detecting sensor that detects whether or not the sheet is on the paper delivering tray.

15. The information processing device according to claim 1, wherein
    the multiple operation units include a door openable and closable to the device body, and
    the hardware processor detects the operation unit operated by the first user based on a result of a detection performed by a door opening detecting sensor that detects the door is opened or closed.

16. The information processing device according to claim 1, wherein
the multiple operation units include an operational panel for the user to perform various kinds of setting operations, and
the hardware processor detects the operation unit operated by the first user based on a result of a detection performed by a touch detecting sensor that detects a touch operation performed by the user to the operational panel.

17. The information processing device according to claim 1, wherein
the hardware processor is connected to a photographing part that photographs the information processing device included in a photographing range and further obtains an image photographed by the photographing unit, and
the hardware processor analyzes the obtained image, and detects the operation unit operated by the first user.

18. A controlling method of an information processing device comprising multiple operation units operable for a user, comprising:
detecting the user;
detecting the operation unit operated by a first user from among the multiple operation units when the first user is being detected;
storing operation information in which the detected operation unit is recorded in a storage;
reading the operation information in the storage and notifying a second user of the operation unit operated by the first user when the second user is detected; and
when the detected second user is the same as the first user, the hardware processor does not notify the second user of the operation unit operated by the first user.

19. A non-transitory recording medium storing a computer readable program to be executed by a hardware processor in an information processing device comprising multiple operation units operable for a user, the hardware processor executing the computer readable program to perform:
detecting the user;
detecting the operation unit operated by a first user from among the multiple operation units when the first user is being detected;
storing operation information in which the detected operation unit is recorded in a storage;
reading the operation information in the storage and notifying a second user of the operation unit operated by the first user when the second user is detected; and
when the detected second user is the same as the first user, the hardware processor does not notify the second user of the operation unit operated by the first user.

\* \* \* \* \*